June 2, 1931.  W. D. HARPER  1,807,592
MOTOR VEHICLE SUSPENSION
Filed Jan. 11, 1928
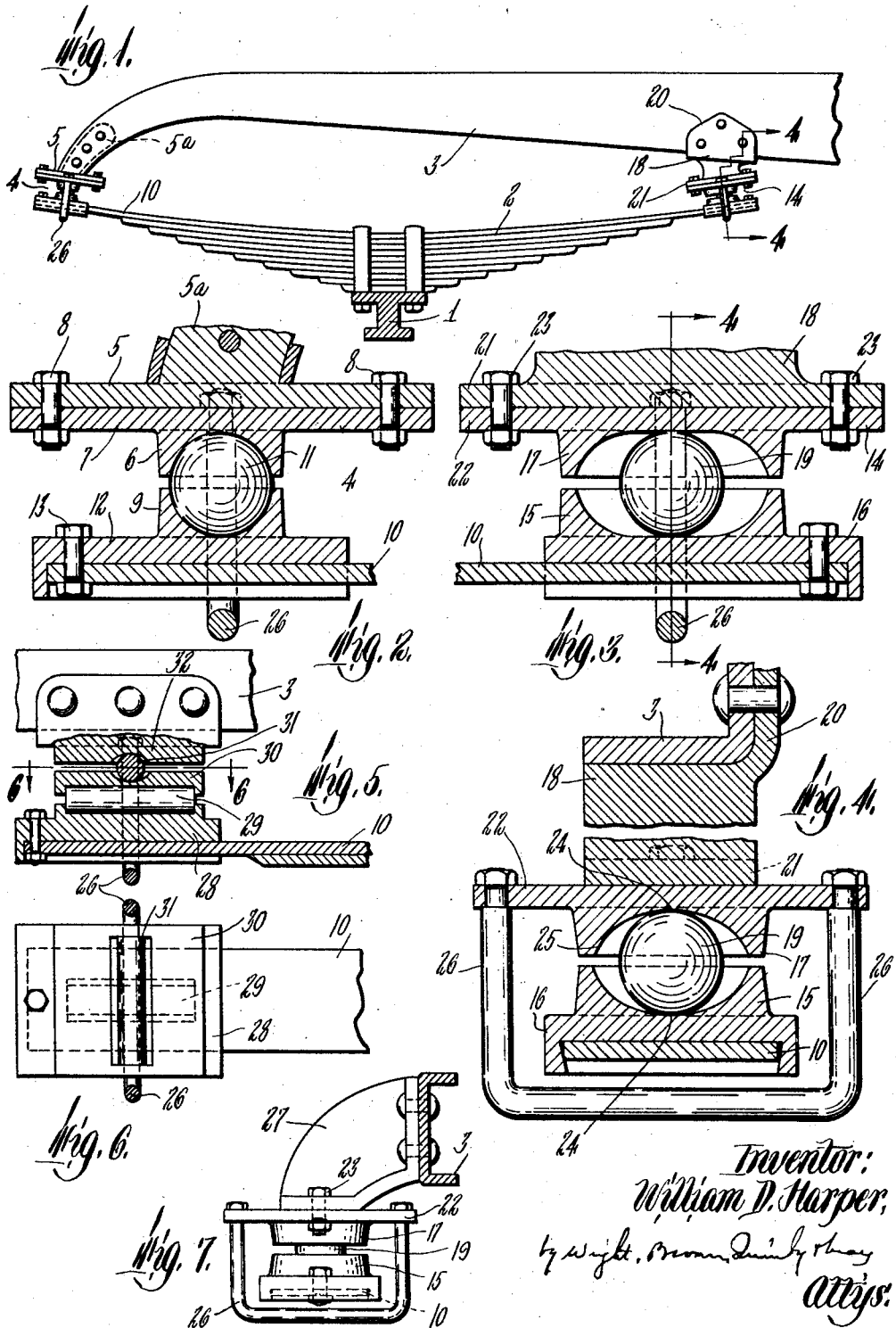

Patented June 2, 1931

1,807,592

UNITED STATES PATENT OFFICE

WILLIAM D. HARPER, OF WELLESLEY, MASSACHUSETTS

MOTOR VEHICLE SUSPENSION

Application filed January 11, 1928. Serial No. 245,924.

This invention relates to automotive vehicles which embody in their structure axles or equivalent wheel supported members, a body or a frame or so-called chassis on which a body is secured, and springs mounted on the axles supporting the frame or body. The object of the invention is to provide, in combination with, and located between such springs and the chassis or the like supported thereon, a means for permitting a limited and yieldingly resisted lateral movement of the chassis, relatively to the springs and road wheels, so as to absorb and diminish shocks given by rough and uneven places in the road, the inertia of the superstructure and load when the direction of the vehicle is changed, and other causes of similar nature.

Many automobiles are built with a standard chassis on which different bodies may be mounted, while others are provided with a body mounted directly on the springs without an interposed chassis. The new step of this invention is applicable to all these different conditions. For the purposes of this specification, therefore, I have adopted the term "frame" as a generic term to include any structure which is mounted on the springs in the first instance, whether such structure is a simple chassis, or a combined chassis and body, or a body only. The invention consists in the novel principles, features and constructions described in the following specification and pointed out in the appended claims, and in all substantial equivalents of the specific embodiments thus described.

In the drawings,—

Fig. 1 is a side elevation of a portion of an automobile frame, one of the supporting springs thereof, and a cross section of one of the axles of the automobile, having my new shock absorbing invention applied thereto;

Fig. 2 is a longitudinal section on a larger scale of the shock absorbing coupling between the lefthand end of the spring and frame shown in Fig. 1;

Fig. 3 is a similar view of the shock absorbing coupling between the right hand end of the spring and frame shown in Fig. 1;

Fig. 4 is a cross section taken on line 4—4 of Figs. 1 and 3 showing the transverse formation of the last named coupling and likewise the transverse formation of the coupling shown in Fig. 2;

Fig. 5 is a sectional view of a modified form of coupling applicable to heavy duty trucks in which rollers are substituted for balls;

Fig. 6 is a plan view of the arrangement shown in Fig. 5;

Fig. 7 is an elevation of a modified form of connection between the coupling and frame applicable to a vehicle in which the springs are not directly under the side members of the frame.

Like reference characters designate the same parts wherever they occur in all the figures.

In Fig. 1 the reference numeral 1 represents the front axle of an automobile, 2 represents one of the forward springs, and 3 the side bar of a chassis such as is widely used. The parts so arranged may be considered as typical of the great majority of automobiles, and the chassis member 3 as typifying any character of frame or body structure which may be supported directly by the springs. I have not shown the entire automobile because the principles embodied in my new shock absorbing connection between the spring and frame are applicable to the rear springs in the manner here shown, and later explained, without modification, or with only such modifications as involve a bare reversal, or the use of fixtures and connections well known and understood in the art. It is to be understood, however, that the road wheels are connected to the axle in any well known or other suitable manner and that the member 3 may have any form, other than the particular one here shown, which is suitable for the purpose. In application to the rear end of the automobile, the axle 1 here shown is replaced by the usual axle housing to which the springs are secured by well known means. In some makes of automobile, the springs are suspended below the axles instead of on top of them, as here shown, but the present invention may be applied without change, whatever may be the particular relationship between the axle and spring in this regard.

Between the end of the frame member 3 and the corresponding end of the spring is a coupling 4 consisting of a plate or bracket 5, having a tongue 5a which is laid against the web of the frame member 3 between the flanges thereof (such member being of channel formation) and riveted or otherwise secured in place; an inverted cup 6 having a flange 7 secured to the bracket 5 by bolts 8 or other equivalent means, an upright cup 9 beneath the cup 6 secured to the longest leaf 10 of the spring, and a ball 11 seated in both cups. The underneath cup shown here has a base 12 with a recess or slot in its under side which fits and embraces the end of the leaf 10 and to which it is secured by a single bolt 13 passing through a hole in the spring, or a plurality of bolts if desired; but it may be formed as an integral part of the spring.

The opposite end of the spring is connected to the chassis by a second coupling 14 consisting of a cup 15 similar in general to the cup 9 (but differing in particulars later described) and having a similar base 16 which is secured to the spring in the manner described, or may be an integral part thereof, an inverted upper cup 17 secured to a bracket 18 attached to the frame member 3, and a ball 19 interposed between and seated in the cups 15 and 17. The bracket 18 lies under the frame member and has a web 20 extending beside the web of the frame member and riveted or otherwise secured thereto. The said bracket likewise has a flange 21 secured to a flange 22 on the inverted cup 17 by bolts 23.

The cups 6 and 9 of the coupling 4 are recessed with a curvature in the front to rear direction which fits the curvature of the interposed ball 11, so that no longitudinal relative movement between the spring and frame at this point is permitted, but propelling thrust or pull is transmitted between the axle and frame. But the recesses of the cups 15 and 17 are elongated in the front to rear direction sufficiently to permit such relative longitudinal movement between the corresponding end of the spring and the frame as takes place due to flexing of the spring. But the cups of both couplings are similarly formed in a transverse direction.

Fig. 4, which specifically shows the transverse section of the coupling 14, shows also the formation of the cups 6 and 9 of the coupling 4 in the transverse direction. The recesses in these cups are concave with a continuous smooth curvature which, in the middle part 24 of each cup, is relatively flat, but in the parts 25 of the sides of the cup has increasing steepness. In other words, the central part of the cup is curved with a long radius of curvature, much longer than the radius of the ball, and the side portions of the cup with shorter radii of curvature which, at the rim approach and become nearly equal to that of the ball. Hence any force acting on the body and frame of the car tending to move this structure sidewise causes the frame to shift laterally upon the springs against very little initial resistance, due to the flatness of the mid part of the cups, but with a rapidly increasing yielding resistance as the balls roll up on the increasingly steep sides of the lower cups and as the increasingly steep sides of the upper cups travel upward on the balls. Gravity thus acts with increasing force to arrest the sidewise movement of the frame and load; and returns the displaced frame to the lowest possible position, which is the neutral position shown in Fig. 4, when the displacing force ceases to act.

Springs of the type used in the vehicle art are substantially rigid to resist lateral deflection and yield only in the vertical direction. But by means of my couplings the frame, and the load supported thereon, are free to move laterally with respect to the springs when subjected to shocks and other forces applied laterally, and the movement thus given is yieldingly arrested and checked. By this means the frame and body, and the persons riding on the vehicle and the dead load carried thereby, are largely guarded from the effects of such shocks, the vehicle is made more stable when changing direction, and the injury to the body and loosening of connections liable to occur as the result of such shocks are largely avoided.

It is to be understood that all the springs, both at front and rear, are connected to the chassis by couplings essentially as described, one end of each spring being so connected by a coupling which prevents any relative forward and rear movement between the spring and chassis and the other end by a coupling which permits such movement when the spring is flexed. These couplings should preferably be at correspondingly the same ends of both forward and rear springs in order that the flexing of the springs need not cause any change in the distance between the axles; but the couplings which prevent the relative forward and rearward movement may be at either the forward ends or the rear ends of the springs. But all the couplings have the transverse formation illustrated in Fig. 4 to permit the lateral yieldingly resisted movement of the frame as a whole with respect to the springs and wheel base.

As a precaution to prevent the frame from leaving the springs when thrown upward by a heavy jolt, each of the couplings is provided with a yoke or guard 26 formed conveniently as a U-shaped bar which passes under the base of the lower cup and upward at both sides thereof, and is secured at its ends in the flange of the upper cup. Sufficient clearance is left between the bottom part of such guard and the base of the lower cup to permit the rise of the frame when displaced laterally as described, but not enough to permit escape of the ball from between the rims of the cups.

The means for securing the couplings to the chassis above described are applicable to the case where the side members 3 of the chassis are directly above the springs. In cases where the chassis members are offset laterally from the springs I provide other forms of bracket, one of which is shown at 27 in Fig. 7. It will be readily apparent that many various brackets or other connecting means may be devised and applied to adapt the couplings to the springs and frame members of automobiles without departing from this invention or from the scope of the protection which I claim.

In the case of trucks designed for heavy loads, in which the total bearing area afforded by the limited number of balls possible to be interposed between the springs and the frame is so small as to cause an intensity of stress at the tangent points of the balls and the cups approaching too nearly the crushing strength of the material, I have devised an alternative form of coupling, using rollers in place of balls by which a much greater length of bearing contact is obtained. Such a modified construction is shown in Figs. 5 and 6, where 3 represents one of the members of the chassis and 10 the upper leaf of one of the springs, as before. A lower plate 28 is fastened to the spring in the same manner as the lower cups previously described, and in its upper face has a groove which receives a roller 29. An intermediate plate 30 rests on the roller 29, having a groove in its under side to receive such roller, and a transverse groove in its upper side to receive a second roller 31 arranged at right angles, or approximately so, to the roller 29. A top plate 32 is secured to the chassis member 3 and has a groove in its under side receiving the roller 31. All the plates are provided with flanges or other stop means embracing the ends of the rollers to prevent their displacement. The roller 29 of each coupling, that is, the one whose axis extends in the forward and rear direction and is therefore adapted to roll laterally, is received in grooves which have the same formation transversely as shown in Fig. 4; whereby the same sort of yieldingly resisted lateral movement of the frame relatively to the springs and wheel base is caused to take place, as previously described. The grooves receiving the transverse roller 31 in the couplings at both ends of the spring are made wide enough in the fore and aft direction to permit longitudinal relative movement of both ends of the springs, for in such vehicles the axles are connected to the frame by tortion or radius rods, torque tubes, or other equivalent means, through which the propelling thrust and pull are transmitted instead of through the springs directly. There must be enough width in these grooves to permit rolling action of the roller and avoid slippage under the greatest relative movement due to flexing of the springs. The continuous curvature with a gradual rise of the bottom of the groove from its lowest point in the center and with changing radius, as previously described, is preferably employed here also. In the latter case both ends of the spring may move lengthwise of the chassis when flexed.

The couplings above described take the place of the bolts and links heretofore used in automobile constructions to connect the springs with the frame, which, while permitting free up and down movement, are yet rigid to prevent any side movement of the frame with respect to the springs. By the present invention I have devised a means which can be applied, in the establishment where the automobiles are manufactured, as a part of the chassis construction and independently of the body, to obtain the benefits due to yieldingly resisted lateral movement of the body and load.

Although I have illustrated the present invention as applied to a combination in which the springs extend in a longitudinal direction of the vehicle, it is to be understood that I am not limited to that type of vehicle, but may apply the invention also to cars in which the springs are transverse, as in the Ford car. The ends of such springs, which heretofore have been connected to the axles by bolts and links, are, in accordance with this invention, connected through couplings such as the coupling 4 shown in Fig. 2, having cups which embrace the balls to transmit propelling thrust, but have raceways in the transverse direction, curved substantially as described in connection with Fig. 4 to permit both the flexing of the spring and the movement of the frame, against yielding increasing resistance, under lateral thrust.

The same principles and constructions hereinbefore described are applicable to trailers as well as to vehicles which have their own power plant, wherefore the term "automobile" as used in its broadest sense in this specification and in the following claims is intended to include such trailers also.

What I claim and desire to secure by Letters Patent is:

1. In a vehicle, an axle, a leaf spring supported by said axle with its ends extending to front and rear of the axle, a frame member, a coupling between one end of said spring and the frame member including a ball and cups embracing said ball and secured, respectively to the spring and the frame member, said cups being formed to embrace the ball at front and rear closely enough to prevent its rolling in those directions, while having open spaces at the sides of the ball which permit it to roll transversely.

2. In a vehicle, an axle, a leaf spring supported by said axle with its ends extending to front and rear of the axle, a frame member, a coupling between one end of said spring and the frame member including a ball and cups embracing said ball and secured, respectively, to the spring and the frame member, said cups having raceways which confine the ball closely at front and rear and extend laterally to either side of the middle position of the ball, being formed with a relatively flat transverse curvature in the central part and an increasingly steep curvature, of shorter radius than the central curvature, at the sides.

3. In a vehicle, an axle, a leaf spring supported by said axle with its ends extending lengthwise of the vehicle to front and rear of the axle, a frame member, a coupling between one end of said spring and the frame member including a ball and cups embracing said ball and secured, respectively, to the spring and to the frame member, said cups being formed to embrace the ball closely at front and rear thereof and to provide spaces at each side of the ball in which transverse rolling movement of the ball is permitted, and a coupling between the other end of the spring and the frame member comprising a ball and embracing cups having cavities wider than the ball in all horizontal dimensions, the transverse form of the cavities comprising means for yieldingly resisting lateral movement of the frame member relatively to the spring.

4. In a vehicle, an axle, a spring supported by said axle, a frame member supported by said spring, and couplings between opposite ends of the spring and frame member, that at one end of the spring having means for transmitting propelling force between the axle and frame member that at the opposite end of the spring having a formation permitting longitudinal movement between the spring and frame member with flexing of the spring, and both being formed to permit and yieldingly resist lateral movement between the frame and spring.

5. A coupling for the purpose described comprising opposed cups and a ball between them, said cups having a curvature substantially fitting that of the ball in one direction and having wider but continuous and smooth curvature in a transverse direction whereby to permit rolling displacement between the cups and balls in the latter direction; the curvature in the last named direction having a radius substantially longer than that of the ball in the central parts of the cups and progressively shortening radii toward the sides of the cups.

6. A coupling for connecting one end of an automobile spring to the frame of the automobile to permit endwise movement of such end as the spring is flexed and yieldingly resisted lateral movement of the body relatively to the spring, comprising opposed cups and a ball between them; said cups having similar cavities in each of which the ball is partly received, and each cavity having greater width in all directions than the diameter of the ball with a bottom which in the central part is approximately straight in the direction of the spring, and the ends of the cavity in this direction are curved with a radius approximately equal to that of the ball; while in the transverse direction the cavity is continuously curved throughout, its curvature at the center being on a radius longer than the diameter of the ball, while between the center and each extremity of the cavity the curvature becomes progressively steeper with decreasing radii of curvature.

7. In a road vehicle, an axle, a spring secured at its middle part to the axle with its ends projecting to either side thereof, a chassis, and supporting and coupling means between the spring and chassis comprising a pair of opposed cups and an included ball interposed between each end part of the spring and the chassis; the cups of each pair having raceways for the included ball in their sides next to one another, of less depth than the radius of the ball, with a continuous smooth concave curvature in the direction transverse to the length of the vehicle, of longer radius at all points than the radius of the ball; and the raceways in one pair of cups having a radius of curvature in the direction lengthwise of the vehicle substantially equal to the radius of the ball; while the raceways in the other pair of cups have a length in the longitudinal direction of the car substantially greater than the diameter of the ball.

8. In a road vehicle, an axle, a spring secured at its middle part to the axle with its ends projecting to either side thereof, a chassis, and supporting and coupling means between the spring and chassis for transmitting propelling force between the axle and chassis, permitting lengthwise movement of the spring upon flexing thereof, relatively to the chassis, and permitting free but gravity-resisted lateral movement of the chassis relatively to the spring; comprising a pair of cups and an included ball between each opposite end part of the spring and the chassis, the cups of one pair having race-ways opposed to one another substantially equal in width (longitudinally of the vehicle) to the included ball, having a length (transversely of the vehicle) greater than the diameter of the ball and a smooth concave bottom curvature in the latter direction which at the middle is relatively flat with a radius greater than the diameter and toward both ends is increasingly steep with progressively shortening radii; and the cups of the other pair having raceways with dimensions and curvatures substantially identical with those of the first cups transversely of the vehicle, but in the lengthwise direction of the vehicle such raceways are longer than the diameter of the ball, have straight line elements at the bottoms and are curved at the ends sufficiently to provide barriers for preventing escape of the ball.

In testimony whereof I have affixed my signature.

WILLIAM D. HARPER.